T. DANQUARD.
MOTOR OPERATED EXHAUSTER.
APPLICATION FILED MAY 3, 1915.
1,285,635.
Patented Nov. 26, 1918.
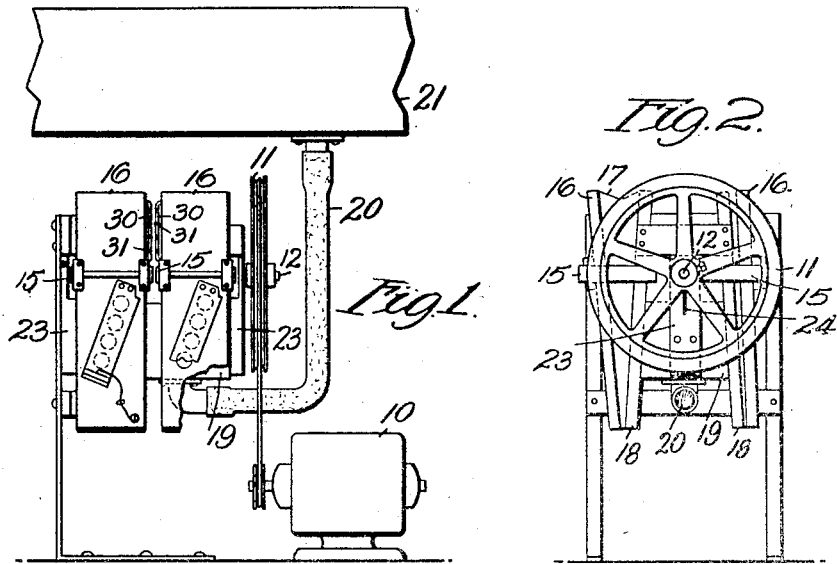
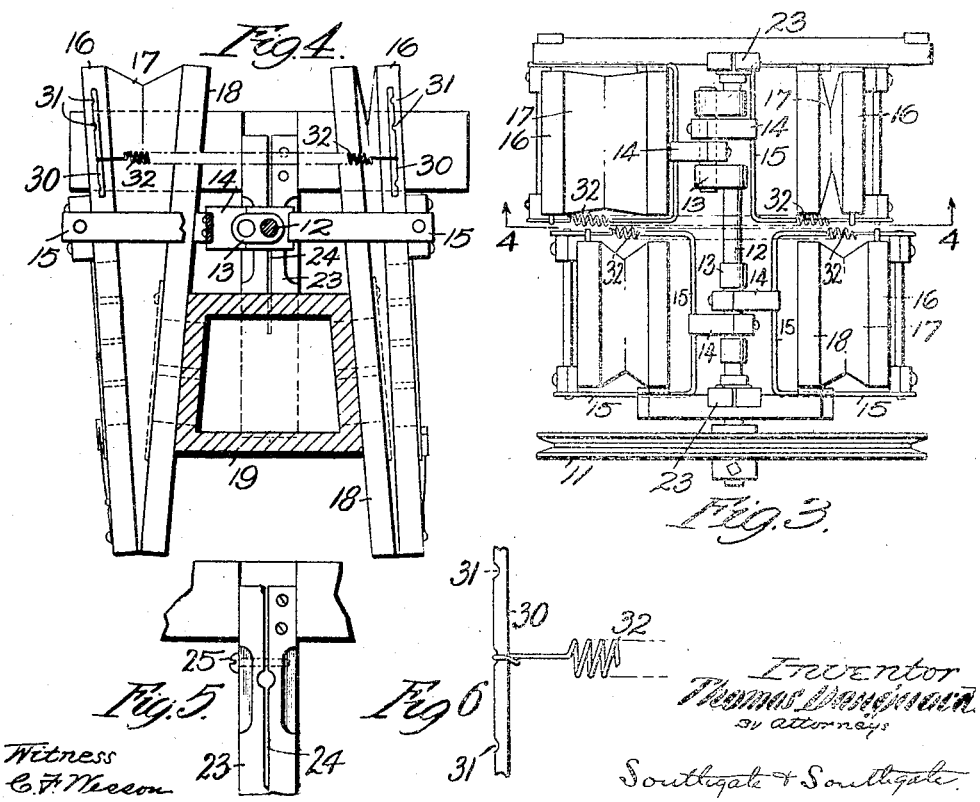

UNITED STATES PATENT OFFICE.

THOMAS DANQUARD, OF NEW YORK, N. Y., ASSIGNOR TO THE AUTO PNEUMATIC ACTION COMPANY, A CORPORATION OF NEW YORK.

MOTOR-OPERATED EXHAUSTER.

1,285,635.   Specification of Letters Patent.   Patented Nov. 26, 1918.

Application filed May 3, 1915. Serial No. 25,639.

*To all whom it may concern:*

Be it known that I, THOMAS DANQUARD, a citizen of the United States, residing at New York, in the county of New York and State of New York, have invented a new and useful Motor-Operated Exhauster, of which the following is a specification.

This invention relates to a motor-operated bellows exhauster capable of general use but particularly adapted for use in player pianos and the like.

The principal objects of this invention are to provide a construction in which no pounding noise will be produced when the bearings are worn; in which the journal for connecting the bellows with the crank shaft always bears on the crank throughout the entire rotation thereof even when considerably worn and in which there is a uniform pressure upon the same; and in which this pressure can be regulated, particularly for increasing it, as the spring loses its tension; and to provide an improved form of antinoise bearing for the shaft.

Other objects and advantages of the invention will appear hereinafter. The invention can be applied with substantially the same results to pneumatic motors.

Reference is to be had to the accompanying drawings, in which—

Figure 1 is an elevation of a bellows exhauster constructed in accordance with this invention designed to be operated by an electric motor;

Fig. 2 is an end view of the same;

Fig. 3 is a plan on enlarged scale;

Fig. 4 is a sectional view on the line 4—4 of Fig. 3;

Fig. 5 is an end view of the bearing for the crank shaft, and

Fig. 6 is a side elevation of the adjusting device for the spring.

When a bellows exhauster is used in connection with a motor especially if used in addition to the regular foot operated bellows and at the side of the same, it has to go into a small space. This is made possible by speeding it up. It has been found in practice that on account of the high speed a good deal of strain is exerted on the bearings of the crank shaft and consequently wear on the journals. If the journals are worn even a slight amount, a pounding or rattling noise is caused which obviously is highly objectionable in a musical instrument. In order to avoid this possibility and permit a noiseless operation even after the journals are worn, means is provided according to this invention whereby the movable leaves of the bellows are always caused to press toward or from the shaft with a spring pressure which is constant independently of the position of the crank and which can be regulated for the purpose of increasing the pressure if the spring loses some of its tension. This spring pressure also is balanced on the two sides of the shaft according to the preferred embodiment of this invention.

In the form shown in the drawings a motor 10 is shown for driving a pulley 11 fixed on the crank shaft 12. This crank shaft in the present instance is shown as provided with two cranks 13. On each crank are two blocks 14 split at the crank bearing and connected with a pair of yokes 15. Each of these yokes is connected with a pivoted leaf 16 of a bellows pneumatic 17. The stationary leaf 18 is fixed on the body of the wind chest 19. The construction of these bellows is not important and it may be said simply that they have the necessary valves so that when the movable leaves are operated by the shaft they will exhaust the wind chest 19. This communicates through a tube 20 with the main wind chest 21 of the instrument and thus exhausts air from the action (not shown).

The shaft 12 is shown as mounted in two bearings each pair being formed in a support 23. This support is split centrally at 24 and each half of the bearing for the shaft is formed on one side of the slit. One of the halves is fixed by screws or the like to a part of the frame which is connected with the fixed leaves and wind chest and the other part is free. A screw 25 is provided extending from the free part into the stationary part so that the former can be adjusted to take up wear and keep the bearing tight and noiseless. This bearing will stay noiseless after extensive use.

The main feature of the invention however consists in the following. On each movable leaf is a rod or support 30. This is provided with notches 31 in the outer side and the two rods on the two opposite movable leaves are exactly opposite each other and of course on opposite sides of the crank shaft. Extending between two of these rods is a so-called spiral spring 32, the ends of which engage the rod in the notches. The object of these springs is to cause the movable leaves of the bellows to be pressed yieldingly toward the crank of the crank shaft at all times with an even pressure so that if the bearings wear they will not knock back and forth during the rotation of the shaft, consequently will not cause a pounding noise. It will be seen also that one spring does for two pneumatics in the present case and that the pressure on the two sides of the shaft is equalized by the provision of a spring extending across. The tension of the spring is kept constant by the fact that if one leaf moves away from the shaft the other moves toward it a substantially equal distance so that the spring is always kept to the same degree of tautness and under the same tension. Furthermore the pressure is balanced on both sides of the shaft and if the spring loses its tension to any degree it can be raised so as to enter a higher notch in the rod, or even be located at an inclination, and thus have its tension increased because its ends will then be at a greater distance from the hinges or pivot joints of the movable leaf of the pneumatic. The result of this is that no matter how much the journal shall wear, it always bears against the shaft and the knocking noise is avoided.

The life of the spring is greatly augmented by the fact that the tension is always constant instead of varying as is the case with springs ordinarily used on bellows and because of the fact that if the tension is lost slightly it can be increased by the simple expedient of moving the spring up as stated.

Although I have illustrated and described only a single embodiment of the invention, I am aware of the fact that many modifications can be made therein by any person skilled in the art and that it can be arranged to be applied to other forms of bellows, either exhausters or motors, without departing from the scope of the invention as expressed in the claim. Therefore, I do not wish to be limited in these respects, but what I do claim is:—

In a pneumatic bellows, the combination of a crank shaft, two bellows pneumatics located on opposite sides of said crank shaft and each having a pivoted leaf on the outer side thereof and a stationary leaf on the inner side and spaced apart, said crank shaft being located in the space between said stationary leaves, yokes for connecting both of said movable leaves with said crank shaft, and a bearing for the crank shaft comprising a split member adjustably connected to take up wear, a member on each movable leaf having notches arranged at different distances from the point at which the bellows is pivoted, and a spring having its ends connected with said members independently of the yokes and held so as to be of substantially constant length during the operation of the device, whereby the connections between the movable leaves and the crank shaft will be substantially constantly but yieldingly pressed toward the crank shaft at all times with a uniform pressure throughout a revolution of the crank shaft, the ends of said springs engaging in said notches whereby they may be moved readily from one notch to another for adjustment of the tension on the leaves of both pneumatics simultaneously.

In testimony whereof I have hereunto set my hand, in the presence of two subscribing witnesses.

THOMAS DANQUARD.

Witnesses:
  WM. J. KEELEY,
  WM. J. BARTON.

Copies of this patent may be obtained for five cents each, by addressing the "Commissioner of Patents, Washington, D. C."